(12) United States Patent
Cha

(10) Patent No.: US 8,928,767 B2
(45) Date of Patent: Jan. 6, 2015

(54) IMAGE PROCESSING DEVICE, IMAGE SIGNAL PROCESSING CHIP, AND ISP CHAIN CONFIGURING METHOD

(75) Inventor: Cheol Cha, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 559 days.

(21) Appl. No.: 12/908,133

(22) Filed: Oct. 20, 2010

(65) Prior Publication Data

US 2011/0285867 A1 Nov. 24, 2011

(30) Foreign Application Priority Data

May 18, 2010 (KR) ........................ 10-2010-0046425

(51) Int. Cl.
*H04N 5/228* (2006.01)
*H04N 5/00* (2011.01)
*G06T 5/00* (2006.01)

(52) U.S. Cl.
CPC ... *H04N 5/00* (2013.01); *G06T 5/00* (2013.01)
USPC ...................................................... 348/222.1

(58) Field of Classification Search
USPC ................. 348/14.04, 211.5, 211.11, 153
See application file for complete search history.

(56) References Cited

U.S. PATENT DOCUMENTS

| 7,065,140 | B1 * | 6/2006 | Ritter et al. | 375/240.25 |
| 2004/0268096 | A1 * | 12/2004 | Master et al. | 712/227 |
| 2008/0101727 | A1 * | 5/2008 | Talla | 382/303 |
| 2011/0032373 | A1 * | 2/2011 | Forutanpour et al. | 348/222.1 |
| 2011/0090242 | A1 * | 4/2011 | Cote et al. | 345/597 |

* cited by examiner

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

An image processing device and an ISP chain constructing method are provided which can arbitrarily reconstruct an ISP chain structure. The image processing device is connected to an image sensor, performs a signal process and includes: N (where N is a natural number of equal to or greater than 2) ISP (Image Signal Processing) functional modules that each perform a predetermined image signal process on one, which is determined by an input selection signal, of data output from the image sensor and the other ISP functional modules; and an output module that outputs one, which is determined by an output selection signal, of output data output from the N ISP functional modules as final output data. Accordingly, it is possible to reconstruct an ISP chain even after the ISP chain is embodied as a chip, thereby providing image processing functions optimized for various product applications.

20 Claims, 9 Drawing Sheets

IMAGE PROCESSING DEVICE, IMAGE SIGNAL PROCESSING CHIP, AND ISP CHAIN CONFIGURING METHOD

CROSS REFERENCE

This application is based on and claims priority under 35 USC 119 from Korean Patent Application No. 10-2010-0046425, filed on May 18, 2010.

BACKGROUND

1. Field of the Invention

The present invention relates to an image processing device, and more particularly, to an image processing device, an image signal processing chip, and an ISP (Image Signal Processing) chain constructing method, which can reconstruct an ISP chain structure.

2. Description of the Related Art

In general, an image processing device is connected to an image sensor, receives sensor data which is an electrical signal (raw data) corresponding to an outside image output from the image sensor, and outputs RGB data, YUV data, or encoded image data corresponding to the sensor data. Such an image processing device includes a variety of ISP functional blocks distinguished by image signal processing functions.

FIG. 1 is a diagram illustrating an ISP chain structure in an image processing device according to the related art.

An ISP chain means a set of ISP functional blocks connected to each other in a constant order. For example, as shown in FIG. 1, N ISP functional blocks 10-1, 10-2, 10-3, . . . , and 10-N are sequentially connected to construct a single ISP chain.

Here, each of the ISP functional blocks 10-1, 10-2, 10-3, . . . , and 10-N performs one of image signal processing functions such as noise reduction, edge enhancement, gamma correction, and color interpolation.

Referring to FIG. 1, the ISP chain is constructed in the order of the first ISP functional block 10-1, the second ISP functional block 10-2, the third ISP functional block 10-3, . . . , and the N-th ISP functional block 10-N. The ISP functional blocks 10-1 to 10-N of having a fixed execution order sequentially perform signal processes to acquire a final image processing result ISP Output.

The image processing device is mounted on a mobile terminal so as to cause the mobile terminal to serve as an imaging device. That is, the image processing device is mounted on a mobile terminal such as a mobile phone, a PDA, and an MP3 player and is configured to convert external images into electronic data and to store the electronic data. In this case, the image processing device requires a variety of image signal processes depending on product applications of the mobile terminals.

However, as shown in FIG. 1, after the ISP chain structure of the image processing device is determined and is embodied as a chip, it is not possible to change the order, thereby making it difficult to implement image signal processing functions optimized for various product applications.

SUMMARY

An advantage of some aspects of the invention is that it provides an image processing device, an image signal processing chip, and an ISP chain constructing method, which can reconstruct an ISP chain even after the ISP chain is embodied as a chip, thereby providing image processing functions optimized for various product applications.

Another advantage of some aspects of the invention is that it provides an image processing device, an image signal processing chip, and an ISP chain constructing method, which can allow a user to determine an execution order of ISP functions for processing images, thereby acquiring various image processing results from the same sensor data.

According to an aspect of the invention there is provided an image processing device which is connected to an image sensor and performs a signal process, including: N (where N is a natural number of equal to or greater than 2) ISP (Image Signal Processing) functional modules that each perform a predetermined image signal process on one, which is determined by an input selection signal, of data output from the image sensor and the other ISP functional modules; and an output module that outputs one, which is determined by an output selection signal, of output data output from the N ISP functional modules as final output data.

The n-th ISP functional module (where n is a natural number equal to or less than N) which is one of the N ISP functional modules may include: a multiplexer that selects as input data one of the sensor data output from the image sensor and output data output from the N−1 ISP functional modules other than the n-th ISP functional module out of the N ISP functional modules on the basis of the input selection signal; and a functional block that performs a predetermined image signal process on the input data.

The image processing device may further include a construction changing module that determines the input selection signal, which is input to the ISP functional modules, so as to arrange the ISP functional modules on the basis of the reconstructed ISP chain structure. The input selection signal may cause the sensor data to be selected as the input data when the n-th ISP functional module is located at the first stage of the ISP chain structure. The input selection signal may cause the output data of the ISP functional module located at the stage previous to the n-th ISP functional module in the ISP chain structure to be selected as the input data.

The functional block may perform one of image processing functions including noise reduction, edge enhancement, gamma correction, and color interpolation.

The output module may be a multiplexer that selects one of the output data as the final output data on the basis of the output selection signal.

The image processing device may further include a construction changing module that determines the output selection signal to select the output data of the ISP functional module located at the last stage of the ISP chain structure as the final output data.

The output module may further receive the sensor data output from the image sensor and selects one of the sensor data and the output data as the final output data.

According to another aspect of the invention, there is provided an image signal processing chip which is connected to an image sensor and performs a signal process, including: N (where N is a natural number of equal to or greater than 2) ISP (Image Signal Processing) functional modules that each perform a predetermined image signal process on one, which is determined by an input selection signal, of data output from the image sensor and the other ISP functional modules; and an output module that outputs one, which is determined by an output selection signal, of output data output from the N ISP functional modules as final output data.

The n-th ISP functional module (where n is a natural number equal to or less than N) which is one of the N ISP functional modules may include: a multiplexer that includes N input terminals and one output terminal and that selects as input data one of the sensor data output from the image sensor and output data output from the N−1 ISP functional modules other than the n-th ISP functional module out of the N ISP functional modules, which are input via the N input terminals, on the basis of the input selection signal; and a functional block that is connected to the output terminal, receives the input data, and performs a predetermined image signal process on the input data.

The output module may be a multiplexer that includes N input terminals connected to the N ISP functional modules and one output terminal and selects one of the output data input via the N input terminals as the final output data on the basis of the output selection signal.

Alternatively, the output module may be a multiplexer that includes N+1 input terminals, one of which is connected to the image sensor to receive the sensor data and the other of which are connected to the N ISP functional modules to receive the output data, and one output terminal and selects one of the sensor data and the output data input via the N+1 input terminals as the final output data on the basis of the output selection signal.

According to still another aspect of the invention, there is provided an ISP chain constructing method in an image processing device including N (where N is a natural number of equal to or greater than 2) ISP (Image Signal Processing) functional modules that each perform a predetermined image signal process on one, which is determined by an input selection signal, of data output from the image sensor and the other ISP functional modules and an output module that outputs one, which is determined by an output selection signal, of output data output from the N ISP functional modules as final output data, the ISP chain constructing method including the steps of arbitrarily reconstructing an ISP chain structure; and determining the input selection signal of the ISP functional modules and the output selection signal of the output module on the basis of the reconstructed ISP chain structure.

According to still another aspect of the invention, there is provided an ISP chain constructing method in an image processing device including N (where N is a natural number of equal to or greater than 2) ISP (Image Signal Processing) functional modules that each perform a predetermined image signal process on one, which is determined by an input selection signal, of data output from an image sensor and the other ISP functional modules and an output module that outputs one, which is determined by an output selection signal, of sensor data output from the image sensor and output data output from the N ISP functional modules as final output data, the ISP chain constructing method including the steps of arbitrarily reconstructing an ISP chain structure; and determining the input selection signal of the ISP functional modules and the output selection signal of the output module on the basis of the reconstructed ISP chain structure.

Here, the input selection signal of the ISP functional block located at the first stage of the ISP chain structure may cause the sensor data output from the image sensor to be selected as input data. The input selection signal of the n-th ISP functional module (where n is a natural number equal to or less than N) may cause the output data of the ISP functional module located at the stage previous to the n-th ISP functional module in the ISP chain structure to be selected as input data.

The output selection signal may cause the output data of the ISP functional module located at the last stage in the ISP chain structure to be selected as the final output data.

Other aspects, features, and advantages will become apparent from the accompanying drawings, the appended claims, and the detailed description.

According to the above-mentioned configurations, it is possible to reconstruct an ISP chain even after the ISP chain is embodied as a chip, thereby providing image processing functions optimized for various product applications.

It is also possible to allow a user to determine an execution order of ISP functions for processing images, thereby acquiring various image processing results from the same sensor data.

DESCRIPTION OF EXEMPLARY EMBODIMENTS

Figure 1:
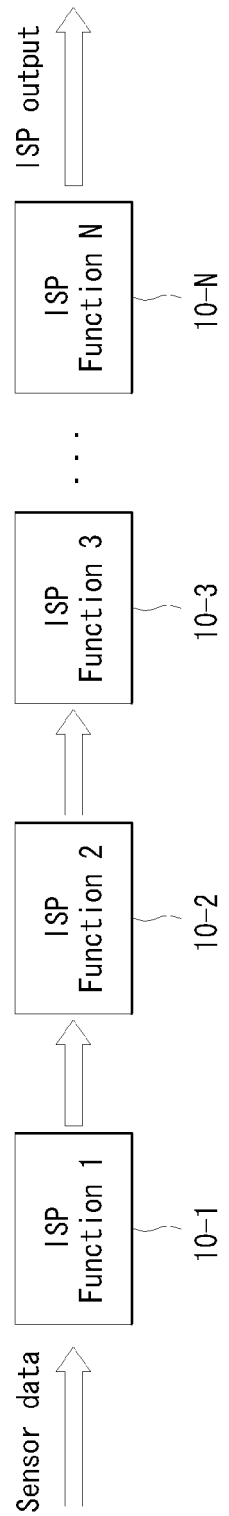
FIG. 1 is a diagram illustrating an ISP chain structure in an image processing device according to the related art.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques involved in the invention makes the gist of the invention obscure, the detailed description will not be made.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "module", and the like, described in the specification mean a unit for performing at least one function or operation and can be embodied by hardware, by software, or by a combination of hardware and software.

When it is determined that detailed description of known techniques involved in the invention makes the gist of the invention obscure, the detailed description will not be made.

Hereinafter, exemplary embodiments of the invention will be described in detail with reference to the accompanying drawings.

Figure 2:
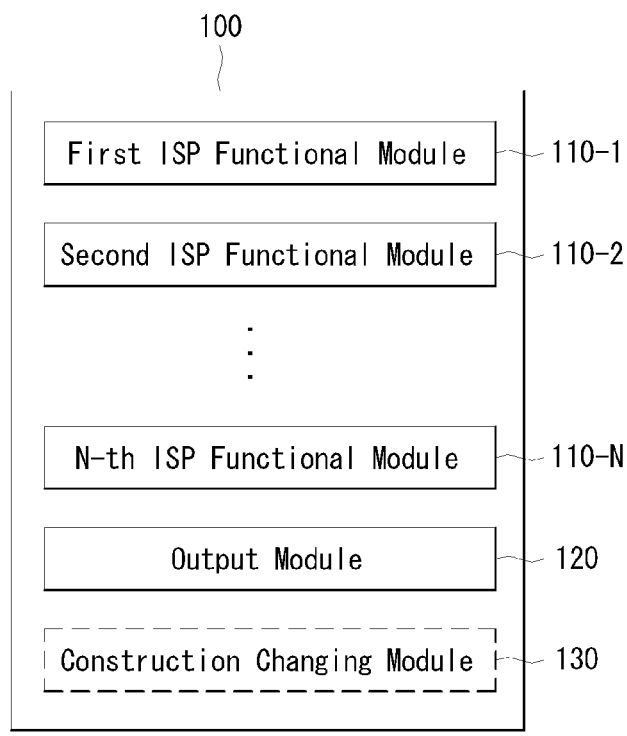
FIG. 2 is a block diagram schematically illustrating the configuration an image processing device according to an embodiment of the invention.

FIG. 2 is a block diagram schematically illustrating the configuration an image processing device according to an embodiment of the invention. FIGS. 3A to 3D are diagrams schematically illustrating the configuration of an ISP functional module according to an embodiment of the invention. FIG. 4 is a diagram illustrating the configuration of an output module according to an embodiment of the invention.

An image processing device 100 according to this embodiment can reconstruct an execution order of ISP functional blocks performing various image signal processing functions and can provide image processing functions suitable for characteristics of various products.

Referring to FIG. 2, the image processing device 100 according to this embodiment includes N ISP functional modules 110-1, 110-2, ..., and 110-N and an output module 120. Here, N is a natural number equal to or greater than 2. The image processing device 100 may further include a construction changing module 130 in some embodiments.

The image processing device 100 is connected to an image sensor and receives sensor data corresponding to an external image from the image sensor. The sensor data serves as one of input signals of the N ISP functional modules 110-1 to 110-N. The sensor data may be used as one of an input signal of the output module 120.

Each ISP functional module receives data output from the image sensor and/or the other ISP functional modules, select one thereof and performs a predetermined image signal process. The ISP functional module includes a multiplexer and a functional block.

Figure 3A:
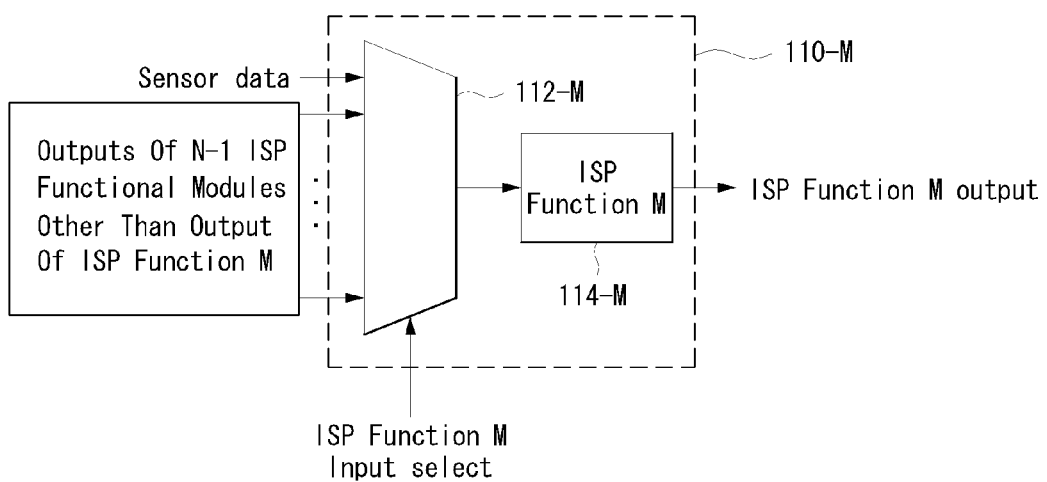
FIGS. 3A to 3D are diagrams schematically illustrating the configuration of an ISP functional module according to an embodiment of the invention.
Figure 4:
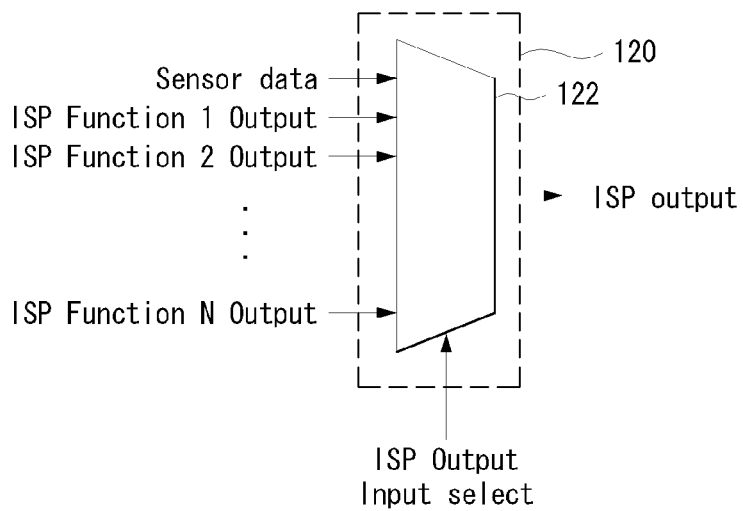
FIG. 4 is a diagram illustrating the configuration of an output module according to an embodiment of the invention.

FIG. 3A illustrates an M-th functional module 110-M as one of the N ISP functional modules.

The M-th ISP functional module 110-M includes an M-th multiplexer 112-M and an M-th functional block 114-M. Here, M is a natural number equal to or less than N.

The M-th multiplexer 112-M has an N-to-one structure including N input terminals and one output terminal, selects as input data one of N input signals input through the N input terminals in response to an input selection signal ISP Function M Input Select, and outputs the input data to the output terminal.

One of the N input terminals is connected to the image sensor and receives sensor data therefrom. The other N−1 input terminals are connected to the N−1 ISP functional modules, respectively, other than the M-th ISP functional module 110-M and receive the output data therefrom.

The M-th functional block 114-M is connected to the output terminal of the M-th multiplexer 112-M and performs a predetermined image signal process on the input data selected and output by the M-th multiplexer 112-M. The image signal process performed by the M-th functional block 114-M is a digital signal process necessary for the process of finally converting the sensor data as electrical signals output from the image sensor into RGB data, YUV data, or encoded image data, and may be one of various signal processes such as noise reduction, edge enhancement, gamma correction, and color interpolation.

The output data ISP Function M Output output from the M-th functional block 114-M is input to the N−1 ISP functional blocks other than the M-th ISP functional module 110-M.

Figure 3B:
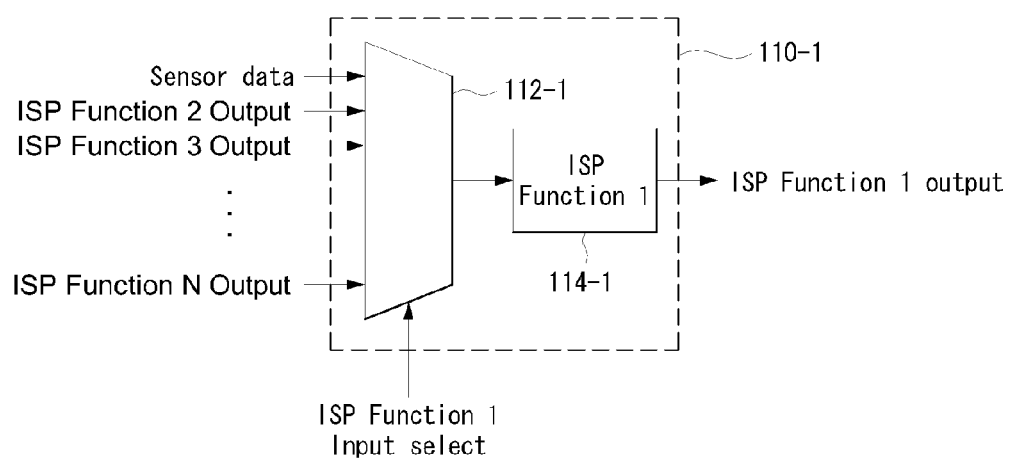
Figure 3C:
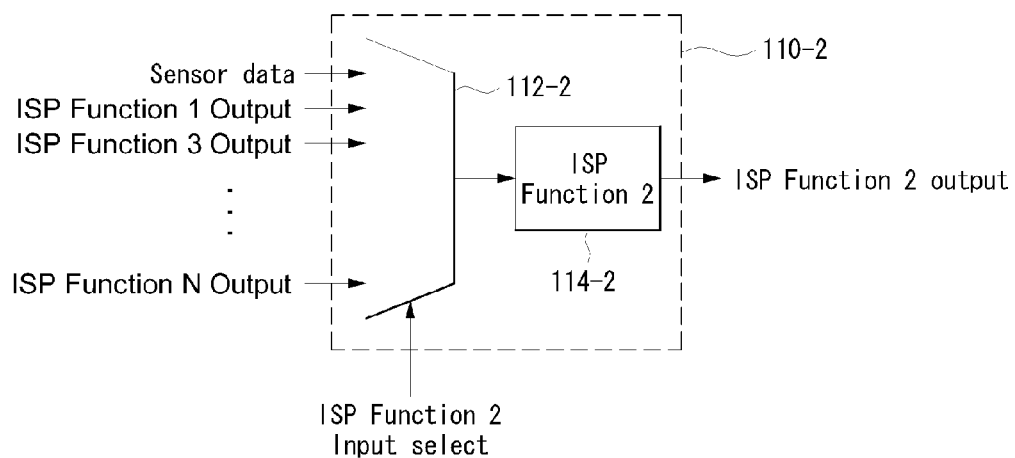
Figure 3D:
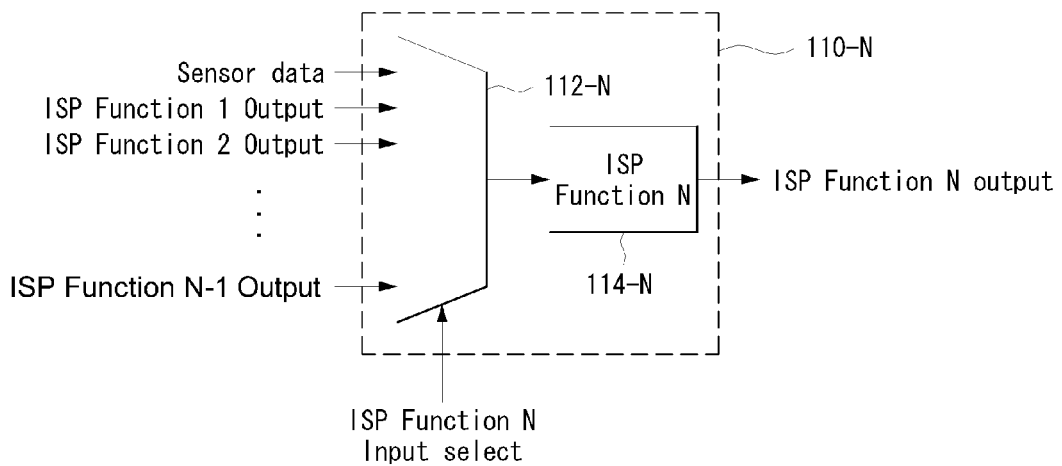

Particularly, in the N ISP functional module, an example where M is equal to 1, an example where M is equal to 2, and an example where M is equal to N are illustrated in FIGS. 3B, 3C, and 3D, respectively.

Referring to FIG. 3B, the first ISP functional module 110-1 includes the first multiplexer 112-1 and the first functional block 114-1. The first multiplexer 112-1 includes N input terminals and one output terminal and serves to select as input data one of N input signals input through the N input terminals in response to the input selection signal ISP Function 1 Input Select and to output the selected input data to the output terminal. The input terminal of the first multiplexer 112-1 is connected to the image sensor and the second to N-th ISP functional modules and receives the sensor data and N−1 output data of the second to N-th ISP functional modules ISP Function 2 Output, ..., and ISP Function N Output as input signals.

Referring to FIG. 3C, the second ISP functional module 110-2 includes the second multiplexer 112-1 and the second functional block 114-2. The second multiplexer 112-2 includes N input terminals and one output terminal and serves to select as input data one of N input signals input through the N input terminals in response to the input selection signal ISP Function 2 Input Select and to output the selected input data to the output terminal. The input terminal of the second multiplexer 112-2 is connected to the image sensor and the first and third to Nth ISP functional modules and receives the sensor data and N−1 output data of the first and third to N-th ISP functional modules ISP Function 1 Output ISP Function 3 Output, ..., and ISP Function N Output as input signals.

Referring to FIG. 3D, the N-th ISP functional module 110-N includes the Nth multiplexer 112-N and the N-th functional block 114-N. The N-th multiplexer 112-N includes N input terminals and one output terminal and serves to select as input data one of N input signals input through the N input terminals in response to the input selection signal ISP Function N Input Select and to output the selected input data to the output terminal. The input terminal of the N-th multiplexer 112-N is connected to the image sensor and the first to (N−1)-th ISP functional modules and receives the sensor data and N−1 output data of the first to (N−1)-th ISP functional modules ISP Function 1 Output, ..., and ISP Function N−1 Output as input signals.

The output module 120 selects one of the output data output from the N ISP functional modules 110-1 to 110-N and outputs the selected output data as the final output data of the image processing device 100.

Referring to FIG. 4, the output module 120 may be a multiplexer 122 having an N+1-to-1 structure including N+1 input terminals and one output terminal, and serves to select as input data one of N+1 input signals input through the N+1 input terminals in response to an output selection signal ISP Output Select and to output the selected input data to the output terminal.

One of the N+1 input terminals is connected to the image sensor and the other N input terminals are connected to the first to N-th ISP functional modules, respectively. Accordingly, the sensor data and the output data ISP Function 1 Output, ..., and ISP Function N Output of the first to N-th ISP functional modules are input as input signals.

In some embodiments, the output module 120 may not receive the sensor data, and may have only N input terminals so as to receive N output data ISP Function 1 Output, ..., and ISP Function N Output of the first to N-th ISP functional modules as input signals.

The N ISP functional modules 110-1 to 110-N and the output module 120 may be embodied as an image signal processing chip and may construct various ISP chain structures depending on a selection signal (the input selection signal or the output selection signal) input to the modules.

According to another embodiment, the image processing device 100 may further include a construction changing module 130. The construction changing module 130 generates and outputs a selection signal to be input to the N ISP functional modules 110-1 to 110-N and the output module 120 depending on a reconstructed ISP chain structure. Accordingly, the image processing device 100 can have various ISP chain structures, thereby implementing an image signal processing system suitable for various product applications.

Accordingly, the construction changing module 130 generates an input selection signal for selecting the sensor data as the input data and outputs the generated input selection signal to the ISP functional module located at the first stage of the reconstructed ISP chain structure. The construction changing module 130 generates an input selection signal for selecting the output data of The construction changing module 130 generates an output selection signal for selecting the output data of the ISP functional module located at the last stage of the ISP chain structure as final output data and outputs the generated output selection signal to the output module 120.

The construction changing module 130 may generate and output the input selection signal to only the ISP functional modules included in a reconstructed ISP chain structure. Since the ISP functional modules not included in the reconstructed ISP chain structure do not affect the final output data, the input selection signal thereof may not be determined.

A method of causing the construction changing module 130 to generate and output the input selection signal and the output selection signal depending on a reconstructed ISP chain structure will be described in detail below with reference to the accompanying drawings.

Figure 5:
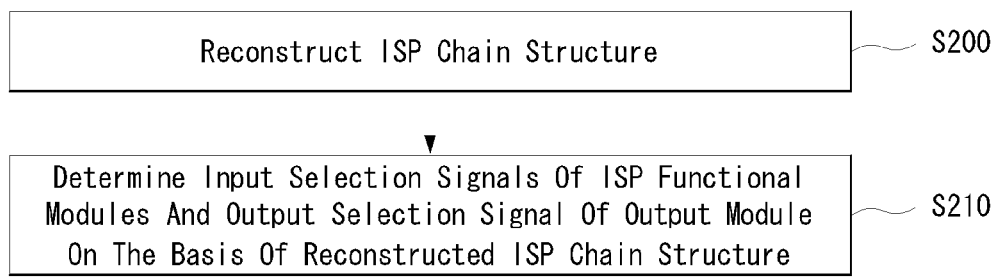
FIG. 5 is a flow diagram illustrating the flow of an ISP chain constructing method in the image processing device according to an embodiment of the invention.

FIG. 5 is a flow diagram illustrating an ISP chain constructing method in the image processing device according to an embodiment of the invention. The steps described below can be performed by the construction changing module which is an element of the image processing device 100.

In step S200, the construction changing module 130 arbitrarily reconstructs the ISP chain structure. The arbitrary reconstruction means that the image processing device changes the ISP chain construction in a predetermined order or in an order input by a user depending on product applications.

In step S210, the input selection signal of the ISP functional modules 110-1 to 110-N and the output selection signal of the output module 120 are determined on the basis of the reconstructed ISP chain structure.

Regarding the input selection signal, the input selection signal of the ISP functional module located at the first stage of the reconstructed ISP chain structure is determined to select the sensor data as the input data. The input selection signal of the other ISP functional modules of the ISP chain structure is determined so as to select the output data of the ISP functional module located at the previous stage as the input data.

Regarding the output selection signal, the output selection signal is determined so as to select the output data of the ISP functional module located at the last stage of the ISP chain structure as the final output data.

The method of determining the input selection signal and the output selection signal will be described in more detail with reference to the drawings.

Figure 6:
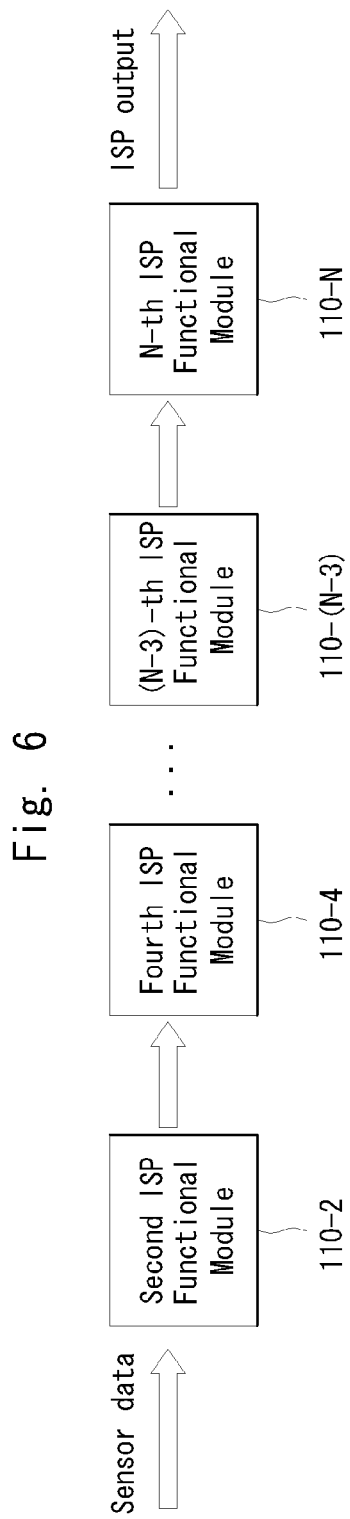
FIG. 6 is a diagram illustrating a reconstructed ISP chain structure according to an embodiment of the invention.
Figure 7:
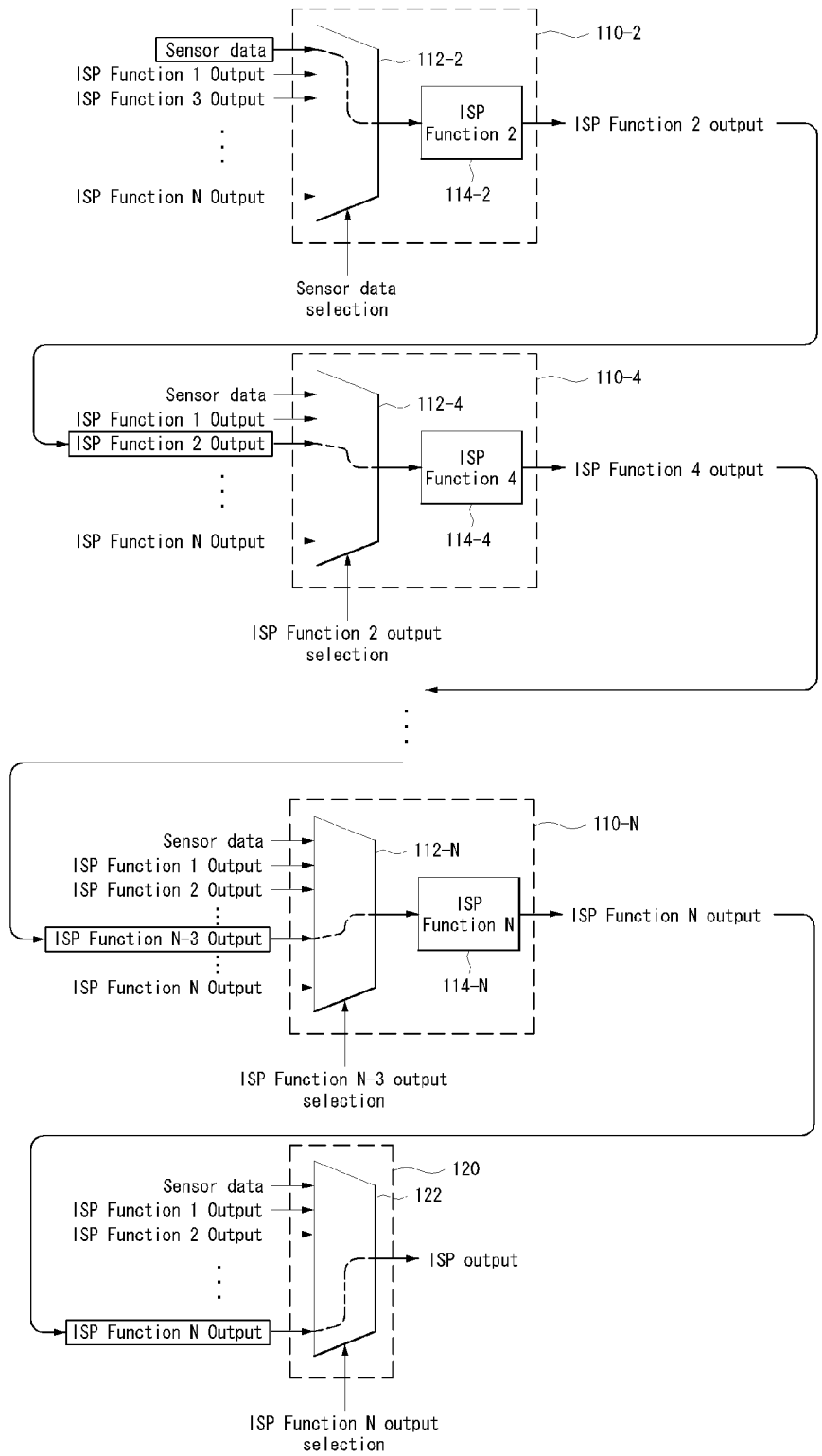
FIG. 7 is a diagram illustrating flows of a selection signal and data in the ISP chain structure shown in FIG. 6.

FIG. 6 is a diagram illustrating a reconstructed ISP chain structure according to an embodiment of the invention. FIG. 7 is a diagram illustrating flows of selection signals and data in the ISP chain structure shown in FIG. 6.

Referring to FIG. 6, the reconstructed ISP chain structure performs image signal processes on the sensor data input from the image sensor in the order of the second ISP functional module 110-2, the fourth ISP functional module 110-4, ..., the (N−3)-th ISP functional module 110-(N−3), and the N-th ISP functional module 110-N and outputs the final output data ISP Output. Here, it is assumed that the ISP chain structure includes K (where K is a natural number equal to or greater than 4 and equal to or less than N) ISP functional modules. However, the invention is not limited this assumption, but an arbitrarily-reconstructed ISP chain structure can have to include one or more ISP functional modules.

As shown in FIG. 7, the input selection signal Sensor Data Selection for selecting the sensor data output from the image sensor as the input data of the functional block 114-2 is input to the multiplexer 112-2 of the second ISP functional module 110-2 located at the first stage of the ISP chain structure. Accordingly, the sensor data is selected and input to the functional block 114-2 and is subjected to an image signal process predetermined for the second ISP functional module 110-2, whereby the resultant data is output as the output data ISP Function 2 Output.

The input selection signal ISP Function 2 Output Selection for selecting the output data ISP Function 2 Output output from the second ISP functional module 110-2 located at the previous stage as the input data of the functional block 114-4 is input to the multiplexer 112-4 of the fourth ISP functional module 110-4 located at the subsequent stage. Accordingly, the output data of the second ISP functional module 110-2 is selected and input to the functional block 114-4 and is subjected to an image signal process predetermined for the fourth ISP functional module 110-4, whereby the resultant data is output as the output data ISP Function 4 Output. This output data is data having been subjected to a first image signal process by the second ISP functional module 110-2 and a second image signal process by the fourth ISP functional module 110-4.

The above-mentioned processes are sequentially performed on the reconstructed ISP chain structure and the image signal processes are performed in the order shown in FIGS. 6 and 7.

In the N-th ISP functional module 110-N located at the last stage of the ISP chain structure, the input selection signal ISP Function N−3 Output Selection for selecting the output data ISP Function N−3 Output output from the (N−3)-th ISP functional module 110-(N−3) located at the previous stage as the input data of the functional block 114-N is input to the multiplexer 112-N. Accordingly, the output data of the (N−3)-th ISP functional module 110-(N−3) is selected and input to the functional block 114-N and is subjected to an image signal process predetermined for the N-th ISP functional module 110-N, whereby the resultant data is output as the output data ISP Function N Output. This output data is data having been subjected to the first image signal process by the second ISP functional module 110-2, the second image signal process by the fourth ISP functional module 110-4, ..., and the (K−1)-th image signal process by the (N−3)-th functional module 110-(N−3).

In the output module 120, the output selection signal ISP Function N Output Selection for selecting the output data ISP Function N Output output from the N-th ISP functional module 110-N located at the last stage of the ISP chain structure as the final output data is input to the multiplexer 122. Accordingly, the output data of the N-th ISP functional module 110-N is output as the final output data ISP Output of the image processing device 100.

Figure 8:
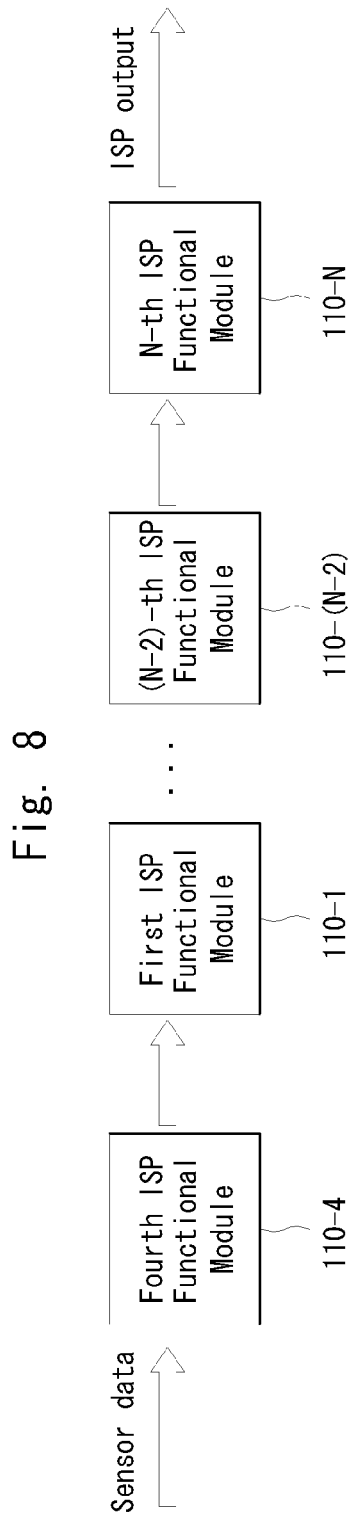
FIG. 8 is a diagram illustrating a reconstructed ISP chain structure according to another embodiment of the invention.

FIG. 8 is a diagram illustrating a reconstructed ISP chain structure according to another embodiment of the invention.

Figure 9:
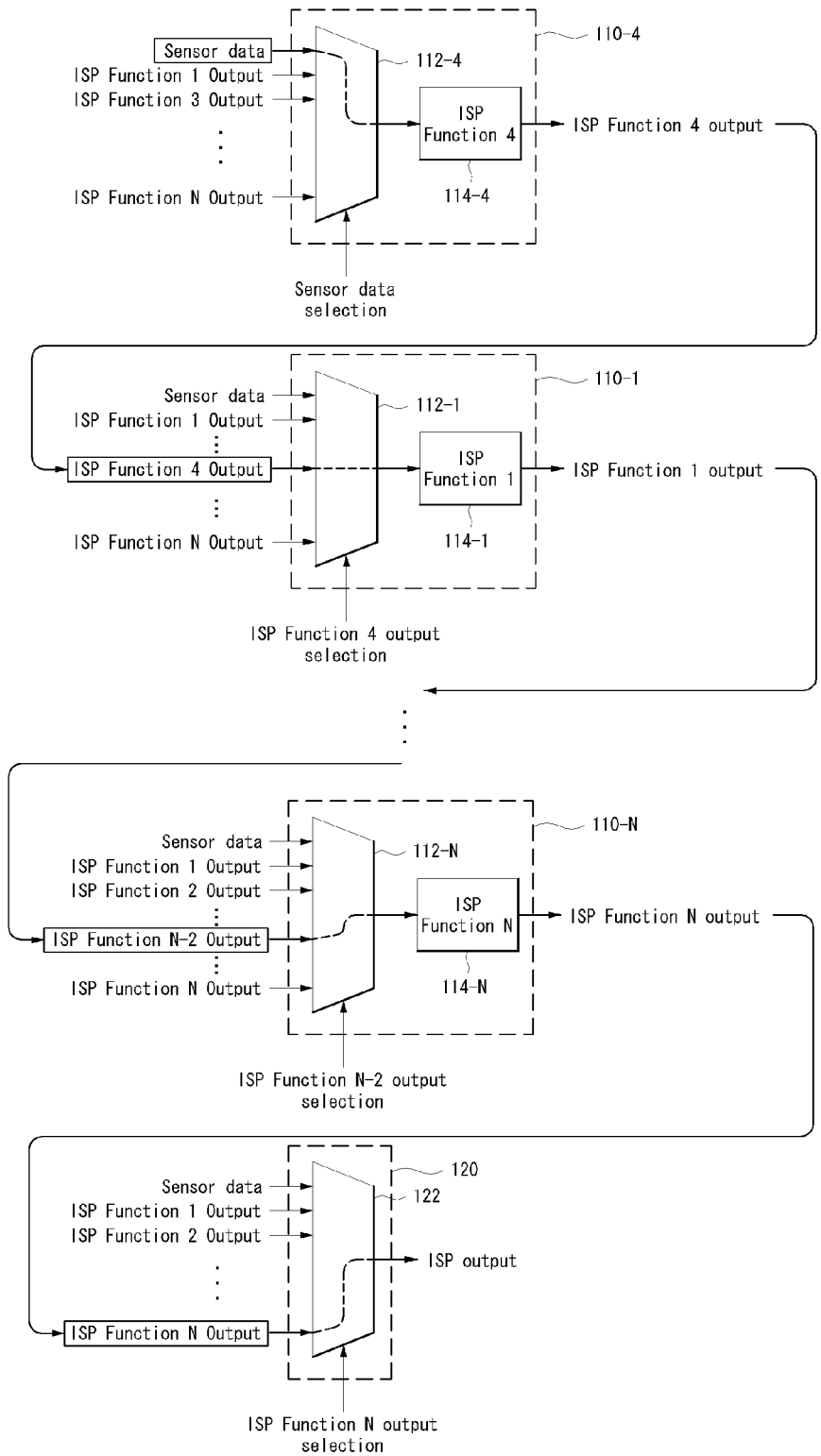
FIG. 9 is a diagram illustrating flows of a selection signal and data in the ISP chain structure shown in FIG. 8.

FIG. 9 is a diagram illustrating flows of selection signals and data in the ISP chain structure shown in FIG. 8.

FIG. 8 illustrates an ISP chain structure reconstructed unlike the ISP chain structure shown in FIG. 6 by determining the input selection signals for the ISP functional modules unlike the description with reference to FIG. 6. The ISP chain structure shown in FIG. 8 performs image signal processes on the sensor data input from the image sensor in the order of the fourth ISP functional module 110-4, the first ISP functional module 110-1, . . . , the (N−2)-th ISP functional module 110-(N−2), and the N-th ISP functional module 110-N and outputs the final output data ISP Output. Here, it is assumed that the ISP chain structure includes K (where K is a natural number equal to or greater than 4 and equal to or less than N) ISP functional modules.

As shown in FIG. 9, the input selection signal Sensor Data Selection for selecting the sensor data output from the image sensor as the input data of the functional block 114-4 is input to the multiplexer 112-4 of the fourth ISP functional module 110-4 located at the first stage of the ISP chain structure. Accordingly, the sensor data is selected and input to the functional block 114-4 and is subjected to an image signal process predetermined for the fourth ISP functional module 110-4, whereby the resultant data is output as the output data ISP Function 4 Output.

The input selection signal ISP Function 4 Output Selection for selecting the output data ISP Function 4 Output output from the fourth ISP functional module 110-4 located at the previous stage as the input data of the functional block 114-1 is input to the multiplexer 112-1 of the first ISP functional module 110-1 located at the subsequent stage. Accordingly, the output data of the fourth ISP functional module 110-4 is selected and input to the functional block 114-1 and is subjected to an image signal process predetermined for the first ISP functional module 110-1, whereby the resultant data is output as the output data ISP Function 1 Output. This output data is data having been subjected to the first image signal process by the fourth ISP functional module 110-4 and the second image signal process by the first ISP functional module 110-1.

The above-mentioned processes are sequentially performed on the reconstructed ISP chain structure and the image signal processes are performed in the order shown in FIG. 8.

In the N-th ISP functional module 110-N located at the last stage of the ISP chain structure, the input selection signal ISP Function N−2 Output Selection for selecting the output data ISP Function N−2 Output output from the (N−2)-th functional module 110-(N−2) located at the previous stage as the input data of the functional block 114-N is input to the multiplexer 112-N. Accordingly, the output data of the (N−2)-th ISP functional module 110-(N−2) is selected and input to the functional block 114-N and is subjected to an image signal process predetermined for the N-th ISP functional module 110-N, whereby the resultant data is output as the output data ISP Function N Output. This output data is data having been subjected to the first image signal process by the fourth ISP functional module 110-4, the second image signal process by the first ISP functional module 110-1, . . . , and the (K−1)-th image signal process by the (N−2)-th functional module 110-(N−2).

In the output module 120, the output selection signal ISP Function N Output Selection for selecting the output data ISP Function N Output output from the N-th ISP functional module 110-N located at the last stage of the ISP chain structure as the final output data is input to the multiplexer 122. Accordingly, the output data of the N-th ISP functional module 110-N is output as the final output data ISP Output of the image processing device 100.

The above-mentioned ISP chain constructing method may be carried out in a time-series automated procedure by a software program built in the image processing device. Codes and code segments of the program will be easily obtained by programmers skilled in the art. The program can be stored in a computer-readable recording medium and can be read and executed by a computer to embody the above-mentioned method. Examples of the recording medium include a magnetic recording medium, an optical recording medium, and a earlier wave medium.

While the invention has been described with reference to the exemplary embodiments, it will be understood by those skilled in the art that the invention can be modified and changed in various forms without departing from the spirit and scope of the invention described in the appended claims.

What is claimed is:

1. An image processing device which is connected to an image sensor and performs a signal process, the image processing device comprising:
    N (where N is a natural number of equal to or greater than 2) ISP (Image Signal Processing) functional modules that are each connected to the image sensor and to each of other N−1 functional modules, the N ISP functional modules configured to perform a predetermined image signal process on one, which is determined by an input selection signal, of data output from the image sensor and the other N−1 ISP functional modules; and
    an output module that outputs one, which is determined by an output selection signal, of output data output from the N ISP functional modules as final output data,
    wherein an operating order of the N ISP functional modules is changeable according to a predetermined order or in an order input by a user depending on product applications, and
    wherein each of the N ISP functional modules includes:
    a multiplexer connected to the other N−1 ISP functional modules and that receives the input selection signal and respective ISP data outputs from the other N−1 ISP functional modules and, in response to the input selection signal, selects one from among the respective ISP data outputs; and
    a functional block connected to the multiplexer and that performs a predetermined image signal process on the selected one of the respective ISP data outputs.

2. The image processing device according to claim 1, wherein an n-th ISP functional module (where n is a natural number equal to or less than N) is one of the N ISP functional modules including the multiplexer and the functional block, the multiplexer selecting:
    as input data one of sensor data output from the image sensor and the respective ISP data outputs.

3. The image processing device according to claim 2, further comprising a construction changing module that determines the input selection signal, which is input to the N ISP functional modules, so as to arrange the N ISP functional modules on the basis of a reconstructed ISP chain structure.

4. The image processing device according to claim 3, wherein the input selection signal causes the sensor data to be selected as the input data when the n-th ISP functional module is located a first stage of the reconstructed ISP chain structure.

5. The image processing device according to claim 3, wherein the input selection signal causes output data of an ISP functional module located at a stage previous to the n-th ISP functional module in the reconstructed ISP chain structure to be selected as the input data.

6. The image processing device according to claim 2, wherein the functional block performs one of image processing functions including noise reduction, edge enhancement, gamma correction, and color interpolation.

7. The image processing device according to claim 1, wherein the output module is a multiplexer that selects one of the output data as the final output data on the basis of the output selection signal.

8. The image processing device according to claim 7, further comprising a construction changing module that determines the output selection signal to selected output data of an ISP functional module located at the last stage of the reconstructed ISP chain structure as the final output data.

9. The image processing device according to claim 1, wherein the output module further receives sensor data output from the image sensor and selects one of the sensor data and the output data as the final output data.

10. The image processing device according to claim 1, wherein the image processing device is an image signal processing chip.

11. The image processing device according to claim 10, wherein
the multiplexer includes N input terminals and one output terminal and that selects as the input data one of sensor data and the respective ISP data outputs out of the N ISP functional modules, which are input via the N input terminals, based on the input selection signal; and
the functional block is connected to the output terminal, receives the input data, and performs the image signal process on the input data.

12. The image processing device according to claim 10, wherein the output module is a multiplexer that includes N input terminals connected to the N ISP functional modules and one output terminal and selects one of the output data input via the N input terminals as the final output data on the basis of the output selection signal.

13. The image processing device according to claim 10, wherein the output module is a multiplexer that includes N+1 input terminals, one of which is connected to the image sensor to receive the sensor data and the other of which are connected to the N ISP functional modules to receive the output data, and one output terminal and selects one of the sensor data and the output data input via the N+1 input terminals as the final output data on the basis of the output selection signal.

14. The image processing device according to claim 1, wherein the output module is a multiplexer that includes N+1 input terminals, one of which is connected to the image sensor to receive the sensor data and the other of which are connected to the N ISP functional modules to receive the output data, and one output terminal and selects one of the sensor data and the output data input via the N+1 input terminals as the final output data on the basis of the output selection signal.

15. The image processing device according to claim 1, wherein the multiplexer is connected to the other N−1 ISP functional modules and is configured to receive the respective ISP data outputs therefrom, the respective ISP data outputs being data that results from image processing by the respective N−1 ISP functional modules.

16. An ISP chain constructing method in an image processing device, the method comprising:
reconstructing an ISP chain structure; and
determining an input selection signal of ISP functional modules and an output selection signal of an output module on the basis of the reconstructed ISP chain structure,
wherein the image processing device includes N (where N is a natural number of equal to or greater than 2) ISP (Image Signal Processing) functional modules that are each connected to the image sensor and to each of other N−1 functional modules, the N ISP functional modules configured to perform a predetermined image signal process on one, which is determined by the input selection signal, of sensor data output from an image sensor and respective ISP data outputs from the other N−1 ISP functional modules and an output module that outputs one, which is determined by the output selection signal, of the sensor data output from the image sensor and output data output from the N ISP functional modules as final output data, each of the N ISP functional modules including a multiplexer connected to the other N−1 ISP functional modules and a functional block connected to the multiplexer,
wherein an operating order of the N ISP functional modules is changeable according to a predetermined order or in an order input by a user depending on product applications, and
wherein the method further comprises:
receiving, by the multiplexer, the input selection signal and the respective ISP data outputs and selecting, in response to the input selection signal, one from among the respective ISP data outputs; and
performing, by the functional block, the predetermined image signal process on the selected one of the respective ISP data outputs.

17. The ISP chain constructing method according to claim 16, wherein the input selection signal of an ISP functional block located at a first stage of the reconstructed ISP chain structure causes the sensor data output from the image sensor to be selected as input data.

18. The ISP chain constructing method according to claim 16, wherein the input selection signal of an n-th ISP functional module (where n is a natural number equal to or less than N) causes output data of an ISP functional module located at a stage previous to the n-th ISP functional module in the reconstructed ISP chain structure to be selected as input data.

19. The ISP chain constructing method according to claim 16, wherein the output selection signal causes output data of an ISP functional module located at a last stage in the reconstructed ISP chain structure to be selected as the final output data.

20. The ISP chain constructing method according to claim 16, wherein the respective ISP data outputs include data that results from image processing by the respective N−1 ISP functional modules.

* * * * *